US012204656B2

(12) United States Patent
Bae

(10) Patent No.: US 12,204,656 B2
(45) Date of Patent: Jan. 21, 2025

(54) METHOD AND SYSTEM FOR TRACKING PATH OF ELECTRONIC DOCUMENT

(71) Applicant: SOFTCAMP CO., LTD., Gyeonggi-do (KR)

(72) Inventor: Hwan-Kuk Bae, Gyeonggi-do (KR)

(73) Assignee: SOFTCAMP CO., LTD., Gyeonggi-do (KR)

( * ) Notice: Subject to any disclaimer, the term of this patent is extended or adjusted under 35 U.S.C. 154(b) by 285 days.

(21) Appl. No.: 17/541,252

(22) Filed: Dec. 3, 2021

(65) Prior Publication Data

US 2022/0207157 A1 Jun. 30, 2022

(30) Foreign Application Priority Data

Dec. 30, 2020 (KR) .................. 10-2020-0187205

(51) Int. Cl.
*G06F 21/60* (2013.01)
*G06F 16/16* (2019.01)
(Continued)

(52) U.S. Cl.
CPC .......... *G06F 21/602* (2013.01); *G06F 16/164* (2019.01); *G06F 16/1734* (2019.01); *G06F 16/1873* (2019.01)

(58) Field of Classification Search
CPC .. G06F 21/602; G06F 16/164; G06F 16/1734; G06F 16/1873; G06F 21/16; G06F 16/955; G06F 21/125; G06F 21/60
See application file for complete search history.

(56) References Cited

U.S. PATENT DOCUMENTS 9,965,505 B2 * 5/2018 Avati .................. G06F 16/2272
10,025,808 B2 * 7/2018 Avati .................... G06F 16/951
(Continued)

FOREIGN PATENT DOCUMENTS

KR 1020100118422 11/2010
KR 20160121248 A * 10/2016 ............... G06K 9/00

OTHER PUBLICATIONS

Moser, Andreas, Christopher Kruegel, and Engin Kirda. "Exploring multiple execution paths for malware analysis." 2007 IEEE Symposium on Security and Privacy (SP'07). IEEE, 2007. (Year: 2007).*

(Continued)

*Primary Examiner* — Jung W Kim
*Assistant Examiner* — Sameera Wickramasuriya
(74) *Attorney, Agent, or Firm* — IPLA P.A.

(57) ABSTRACT

A system and method for tracking the path of an electronic document are provided. The system includes: a log information update unit including: a unique ID generation module configured to, when first electronic document data being loaded in an operating system-based word processor unit is newly created as second electronic document data due to a change in the storage location or name thereof, newly generate a unique ID for the second electronic document data and modify the unique ID of the first electronic document data to a parent ID; and a log information update module configured to generate or update a storage path as log information, and to include the log information in the second electronic document data; and a path tracking unit configured to search for the log information and to identify an execution history from the found log information.

3 Claims, 6 Drawing Sheets

(51) Int. Cl.
*G06F 16/17* (2019.01)
*G06F 16/18* (2019.01)

(56) References Cited

U.S. PATENT DOCUMENTS

| | | | | |
|---|---|---|---|---|
| 2004/0260974 | A1* | 12/2004 | Livshits | G06F 8/71 |
| | | | | 714/19 |
| 2007/0185939 | A1* | 8/2007 | Prahland | G06F 16/1734 |
| 2007/0186068 | A1* | 8/2007 | Agrawal | G06F 11/1464 |
| | | | | 714/E11.12 |
| 2011/0246416 | A1* | 10/2011 | Prahlad | G06F 16/1734 |
| | | | | 707/610 |
| 2012/0215811 | A1* | 8/2012 | Tipper | G06F 21/16 |
| | | | | 707/705 |
| 2013/0091097 | A1* | 4/2013 | Chung | G06F 16/178 |
| | | | | 707/634 |
| 2013/0173530 | A1* | 7/2013 | Laron | G06F 16/176 |
| | | | | 707/608 |
| 2015/0269183 | A1* | 9/2015 | Avati | G06F 16/1865 |
| | | | | 707/634 |
| 2018/0131674 | A1* | 5/2018 | Nelson | H04L 63/123 |
| 2020/0151151 | A1* | 5/2020 | Sasaki | G06F 21/16 |
| 2022/0129526 | A1* | 4/2022 | Bliss | G06F 16/22 |

OTHER PUBLICATIONS

N. Gessa, A. Brutti, V. Cerminara, P. De Sabbata, A. Frascella and C. Novelli, "An environment for a powerful business document schema profiling," eChallenges e-2010 Conference, Warsaw, Poland, 2010, pp. 1-8. (Year: 2010).*

* cited by examiner

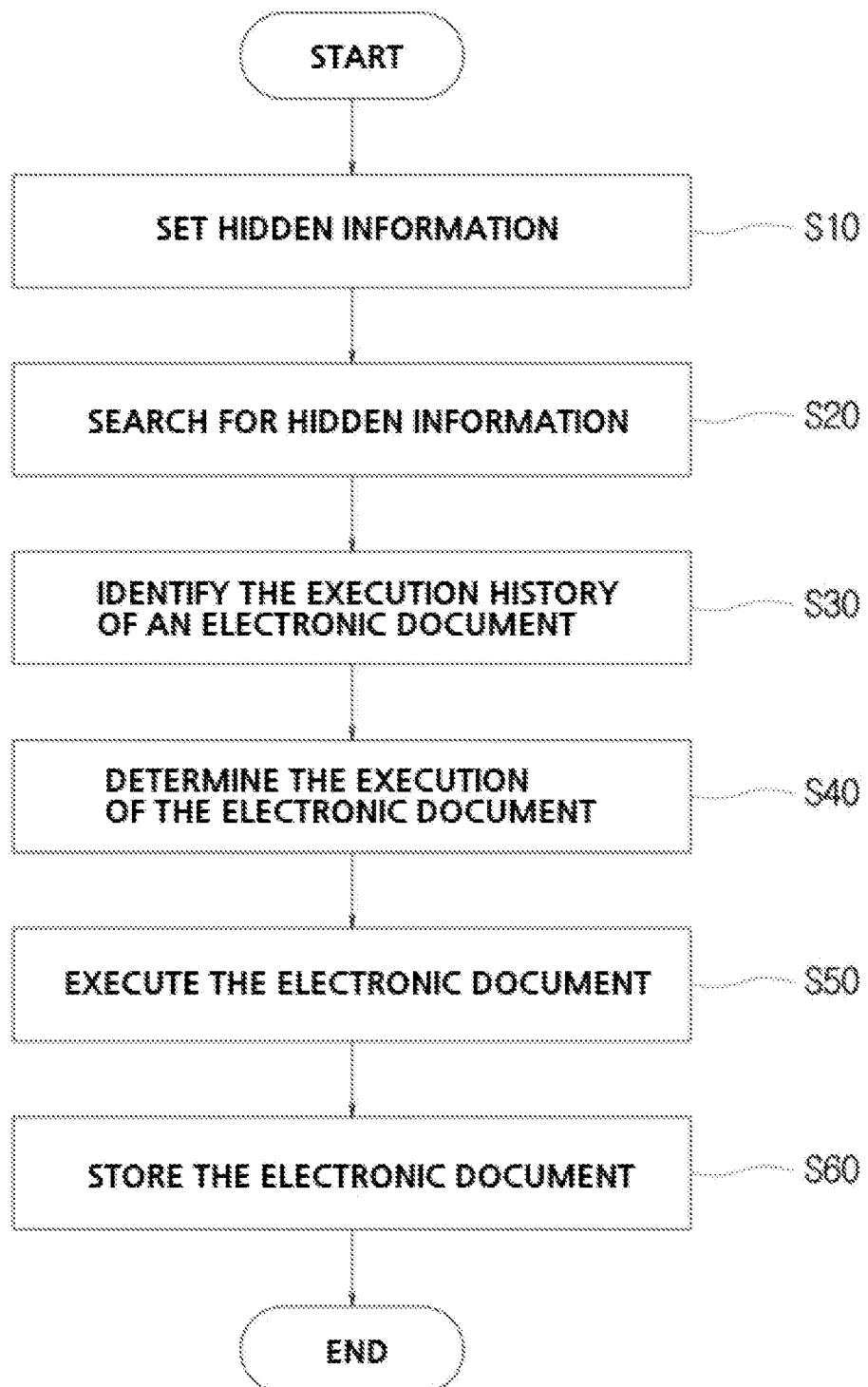

FIG. 6

THE PRECEDING PART OMITTED

```
<?xml version="1.0" encoding="UTF-8" standalone="yes"?>
<Properties xmlns="http://schemas.openxmlformats.org/officeDocument/2006/custom-properties"
 xmlns:vt="http://schemas.openxmlformats.org/officeDocument/2006/docPropsVTypes">
<property fmtid="{D5CDD505-2E9C-101B-9397-08002B2CF9AE}" pid="2" name="_Version">
    <vt:lpwstr>Softcomp</vt:lpwstr>
</property>
</Properties>
```

THE REST OMITTED

METHOD AND SYSTEM FOR TRACKING PATH OF ELECTRONIC DOCUMENT

CROSS-REFERENCE

This application claims the benefit of Korean Patent Application No. 10-2020-0187205 filed on 30 Dec. 2020 with the Korean Intellectual Property Office, which is hereby incorporated by reference herein in its entirety.

BACKGROUND

The present invention relates to a method and system for tracking the path of an electronic document that can enhance the security of data by tracking the distribution path of an electronic document through the duplication of a data file, the change of a file name, etc.

Although the amount of confidential information related to excellent technologies of domestic companies has increased, the risk of divulgence increases and also it is very difficult to identify an illegal divulgence path due to the digitalization of information distribution, so that there are no measures to prevent it even as the number of actual divulgence cases increases, with the result that financial damage is growing gradually. However, since the current document protection systems are designed for copyright protection, it is problematic in that there are no measures against illegal use and the tracking of the illegal use when legal copies are divulged and there is no countermeasure against divulgence conspired by insiders.

Meanwhile, due to recent security incident issues such as the divulgence of personal information, automatic (forced) encryption is applied to all created documents under internal control and reinforcement in the financial sector, and more than 95% of documents are created and distributed in the form of secured documents.

Despite the need for life-cycle management of security target documents and the tracking of distribution paths for security target documents including personal information, internal control security programs currently operating in the financial sector have independent log systems, so that it is difficult to perform coherent association analysis between individual security programs. Therefore, there is a need for a link system for systematic association analysis between security programs.

In addition, there is also a need for a link system for the effective tracking of a process in which the contents inquired by business systems (a customer relationship management (CRM) system, etc.) are stored in terminals (PCs) in the form of documents and then distributed.

Related Art Document: Korean Patent Application Publication No. 10-2010-0118422

SUMMARY OF THE INVENTION

The present invention has been conceived to overcome the above-described problems, and an object of the present invention is to provide a method and system for tracking the path of an electronic document that can enhance the security of data by tracking the distribution path of an electronic document through the duplication of a data file, the change of a file name, etc.

In order to accomplish the above object, there is provided a system for tracking the path of an electronic document, the system including:

a log information update unit including: a unique ID generation module configured to, when first electronic document data being loaded in an operating system (OS)-based word processor unit is newly created as second electronic document data due to a change in the storage location or name thereof, newly generate a unique ID for the second electronic document data and modify the unique ID of the first electronic document data to a parent ID; and a log information update module configured to generate or update a storage path attributable to the creation of the second electronic document data as log information, and to include the log information in the second electronic document data; and a path tracking unit configured to search for the log information in the first electronic document data or second electronic document data, and to identify an execution history from the retrieved log information.

BRIEF DESCRIPTION OF THE DRAWINGS

The above and other objects, features, and advantages of the present invention will be more clearly understood from the following detailed description taken in conjunction with the accompanying drawings, in which:

FIG. 5 is a flowchart sequentially showing the process of performing the security processing of electronic document data based on a tracking system, authenticating a user, and outputting the content of the electronic document data according to an embodiment of the present invention; and FIG. 6 is an image view showing an embodiment of the hidden information of electronic document data whose security processing has been performed.

DETAILED DESCRIPTION OF THE INVENTION

"One embodiment" or "an embodiment" is described with reference to details to be discussed below in various cases, and the accompanying drawings illustrate various embodiments. The following description and the accompanying drawings should be construed as being illustrative and should not be construed as being limitative. Numerous specific details are set forth in order to provide a thorough understanding of various embodiments of the invention. However, in specific embodiments, well-known or conventional details are not described in order to provide concise descriptions of embodiments of the present invention.

Reference to "one embodiment" or "an embodiment" herein means that a particular feature, structure, or characteristic described in conjunction with the embodiment may be included in at least one embodiment. The appearances of the phrase "in one embodiment" at various locations in the specification are not necessarily all referring to the same embodiment.

Figure 2:
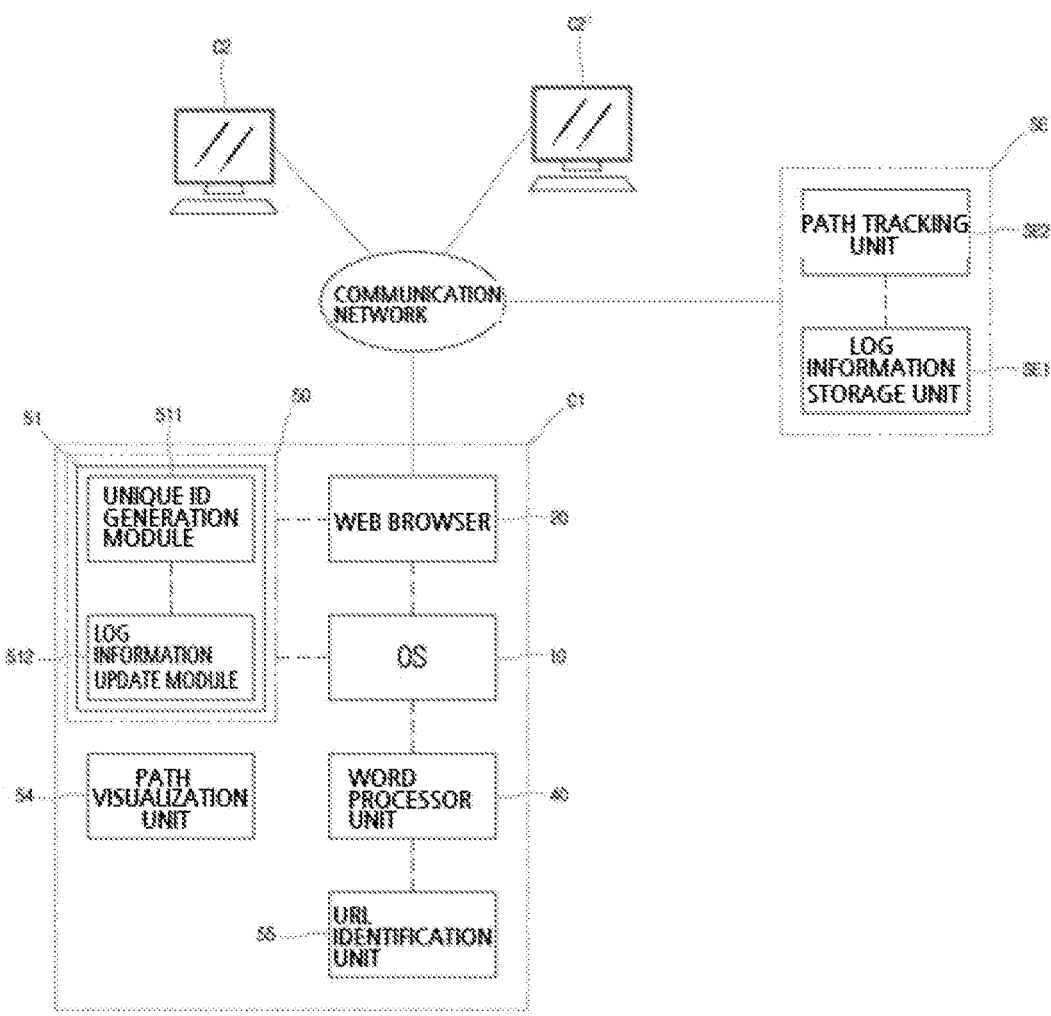
FIG. 2 is a block diagram showing a system for tracking the path of an electronic document according to an embodiment the present invention.

The embodiments of the present invention may include a special-purpose or general-purpose computer including various types of computer hardware, as will be described in greater detail below. FIG. 2 depicts a schematic diagram of an exemplary computing system that may be used to implement the features of the present invention, which is referred to as a "client." The described client is merely one example of such a suitable computing environment and is not intended to suggest any limitation as to the scope of use or functionality of the present invention. The present invention should not be construed as having any dependency or requirement with respect to any one or any combination of components shown in FIG. 2.

The terms to be used to describe a "method and system for tracking the path of an electronic document" according to the present invention will be defined first. The "method and system for tracking the path of an electronic document" according to the present invention refers to software, a device, or a process that is designed to identify a distribution path through which electronic document data creates new electronic document data due to a change in the storage location or name thereof and is then transmitted. The "method and system for tracking the path of an electronic document" is installed on a client, and operates in conjunction with software that executes electronic documents. Hereinafter, the "method for tracking the path of an electronic document" and the "system for tracking the path of an electronic document are referred to as the "tracking method" and "tracking system," respectively.

An "electronic document" according to the present invention is standardized as data in the form of a document that is created, and transmitted and received, or stored in an electronic form by a device having information processing capability, such as a computer. The data may include content such as text, images, and graphs. As for the supported extensions of electronic document-related software for execution on a computer, versions such as doc, tin, ppt, dock, xlsx, and pptx supported by MS Office and versions such as HWP and PDF may be listed as examples. In addition, various other extensions may be listed as examples. Furthermore, a "word processor unit" refers to office software that can read, edit, or create electronic documents. A "log information updater" according to the present invention refers to software that generates the unique ID and parent ID of electronic document data when the corresponding electronic document data is newly created while operating in conjunction with a word processor unit. A "security agent" according to the present invention refers to software that generates and inputs hidden information in an electronic document, searches for and checks the hidden information configured in the electronic document, and reads the unique ID and parent ID, security level, and log information of the electronic document. In addition, "authority information" refers to the authority granted to a user or an executing PC in connection with the content reading, number of readings, editing, decryption, exporting, printing, print marking, expiration date, automatic destruction, authority change, content duplication, etc. of electronic documents. Accordingly, the range of use for electronic documents varies depending on who a user is and what an executing PC is.

A system for tracking the path of an electronic document according to the present invention will be described below.

A tracking system according to an embodiment of the present invention includes: a client including a log information update unit, the log information update unit including: a unique ID generation module configured to, when first electronic document data being loaded in an operating system (OS)-based word processor unit is newly created as second electronic document data due to a change in a storage location or name thereof, newly generate a unique ID for the second electronic document data and modify a unique ID of the first electronic document data to a parent ID; and a log information update module configured to generate or update a storage path attributable to the creation of the second electronic document data as log information, and to store the log information in a log information storage unit; and a path tracking server including: the log information storage unit configured to store the log information created or updated by the log information update unit; and a path tracking unit configured to search the log information storage unit for log information for each unique ID of the first electronic document data or second electronic document data, and to identify an execution history from the retrieved log information. A tracking system according to another embodiment of the present invention includes: a log information update unit including: a unique ID generation module configured to, when first electronic document data being loaded in an operating system (OS)-based word processor unit is newly created as second electronic document data due to a change in a storage location or name thereof, newly generate a unique ID for the second electronic document data and modify a unique ID of the first electronic document data to a parent ID; and a log information update module configured to generate or update a storage path attributable to the creation of the second electronic document data as log information, and to store the log information in a log information storage unit; the log information storage unit configured to store the log information created or updated by the log information update unit; and a path tracking unit configured to search the log information storage unit for log information for each unique ID of the first electronic document data or second electronic document data, and to identify an execution history from the retrieved log information. The tracking system may further include a path visualization unit configured to visualize and output the execution history of the log information, retrieved by the path tracking unit, as a connection structure of nodes and edges. The tracking system may further include a URL identification unit configured to, when the first electronic document data is downloaded through a web browser and newly created as the second electronic document data, identify information about a URL from which the first electronic document data has been transmitted in the alternative stream of an NTFS file system and add the URL information to log information of the second electronic document data. The tracking system may further include a security agent configured to generate hidden information, in which a security agent-dedicated fmtID is designated, by hiding custom.xml, containing a unique ID and a parent ID for the security of the first electronic document data or second electronic document data, at a specific location in the source code of the corresponding electronic document data using a steganographic technique.

A method and system for tracking the path of an electronic document according to the present invention will be described in greater detail below with reference to the accompanying drawings.

Figure 1:
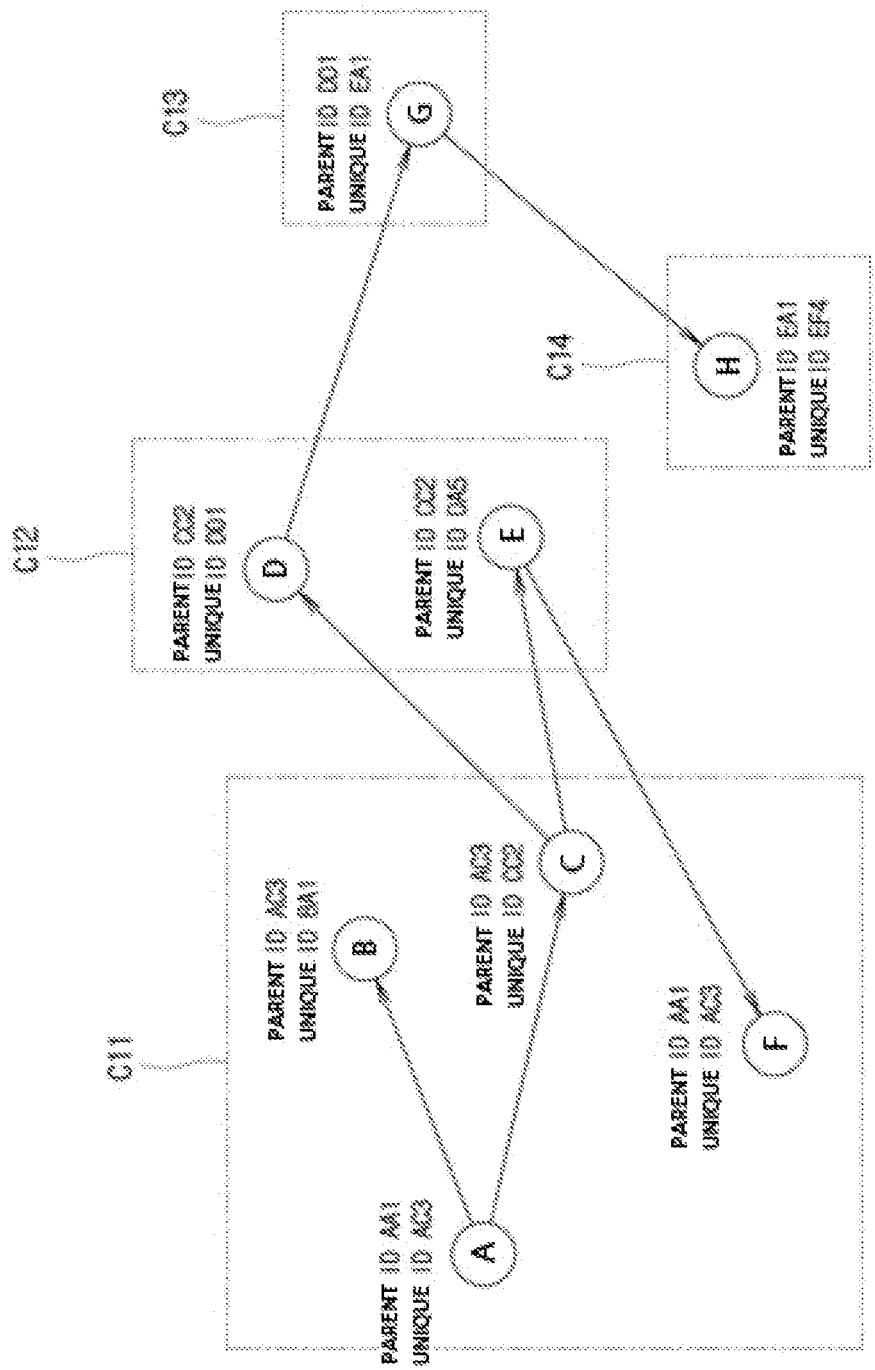
FIG. 1 is a diagram showing a state in which the distribution path of electronic document data is visualized as a connection structure of nodes and edges according to an embodiment of the present invention.
Figure 3:
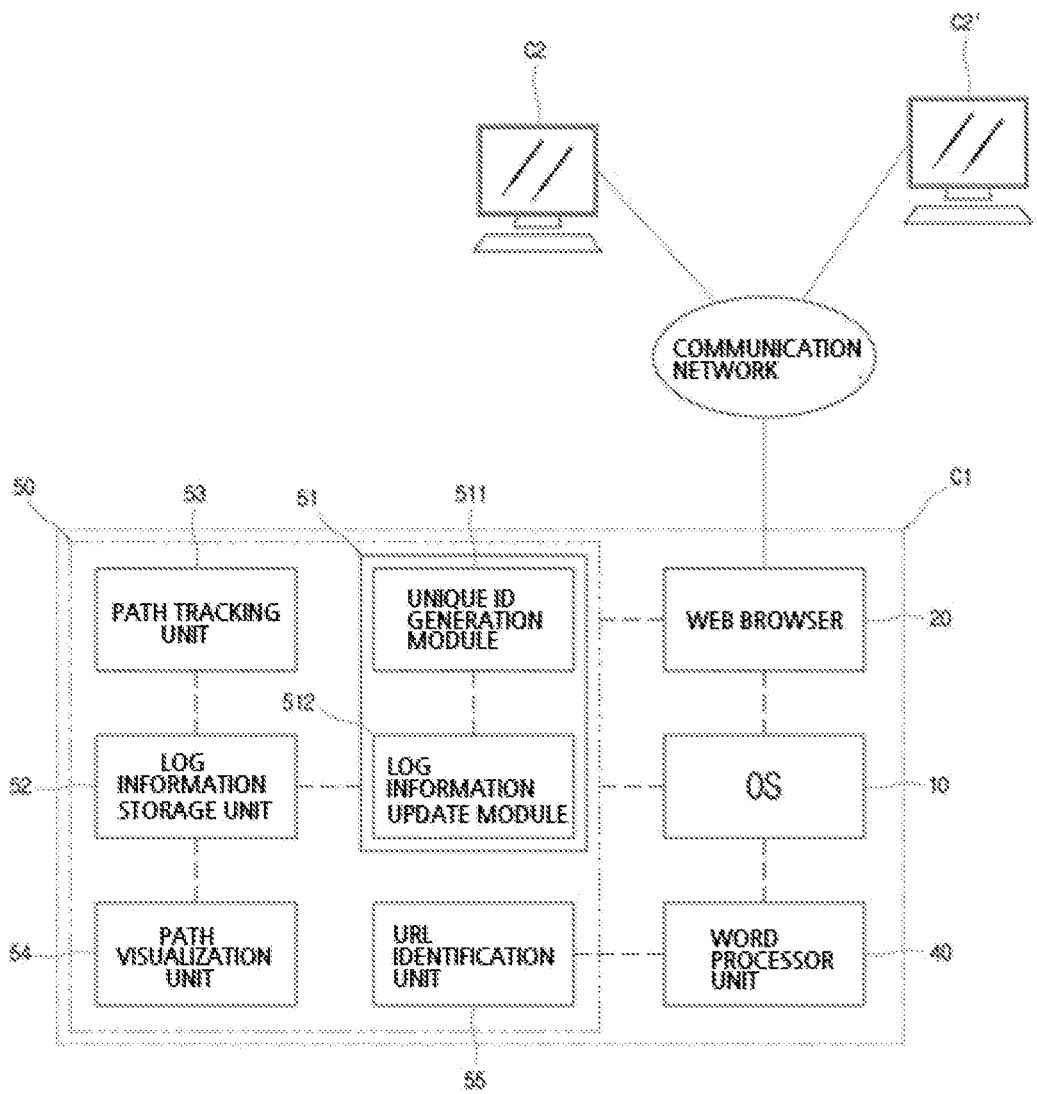
FIG. 3 is a block diagram showing a system for tracking the path of an electronic document according to another embodiment the present invention.

FIG. 1 is a diagram showing a state in which the distribution path of electronic document data is visualized as a connection structure of nodes and edges according to an embodiment of the present invention, FIG. 2 is a block diagram showing a system for tracking the path of an electronic document according to an embodiment the present invention, and FIG. 3 is a block diagram showing a system for tracking the path of an electronic document according to another embodiment the present invention.

Referring to FIGS. 1 to 3, a tracking system according to an embodiment of the present invention includes:

a log information update unit 51 including: a unique ID generation module 511 configured to, when first electronic document data being loaded in an operating system (OS) 10-based word processor unit 40 is newly created as second electronic document data due to a change in the storage location or name thereof, newly generate a unique ID for the second electronic document data and modify the unique ID of the first electronic document data to a parent ID; and a log information update module 512 configured to generate or update a storage path attributable to the creation of the second electronic document data as log information, and to include the log information in the second electronic document data; and a path tracking unit 53 configured to search for the log information in the first electronic document data or second electronic document data, and to identify an execution history from the retrieved log information.

As shown in FIG. 2, a tracking system according to another embodiment of the present invention includes:

a client C1 including a log information update unit 51, the log information update unit 51 including: a unique ID generation module 511 configured to, when first electronic document data being loaded in an operating system (OS) 10-based word processor unit 40 is newly created as second electronic document data due to a change in the storage location or name thereof, newly generate a unique ID for the second electronic document data and modify the unique ID of the first electronic document data to a parent ID; and a log information update module 512 configured to generate or update a storage path attributable to the creation of the second electronic document data as log information, and to store the log information in a log information storage unit SE1; and a path tracking server SE including: the log information storage unit SE1 configured to store the log information created or updated by the log information update unit 51; and a path tracking unit SE2 configured to search the log information storage unit SE1 for log information for each unique ID of the first electronic document data or second electronic document data, and to identify an execution history from the retrieved log information.

As shown in FIG. 3, a tracking system according to still another embodiment of the present invention includes:

a log information update unit 51 including: a unique ID generation module 511 configured to, when first electronic document data being loaded in an operating system (OS) 10-based word processor unit 40 is newly created as second electronic document data due to a change in the storage location or name thereof, newly generate a unique ID for the second electronic document data and modify the unique ID of the first electronic document data to a parent ID; and a log information update module 512 configured to generate or update a storage path attributable to the creation of the second electronic document data as log information, and to store the log information in a log information storage unit 52;

the log information storage unit 52 configured to store the log information created or updated by the log information update unit 51; and a path tracking unit 53 configured to search the log information storage unit 52 for log information for each unique ID of the first electronic document data or second electronic document data, and to identify an execution history from the retrieved log information.

As a result, in the first embodiment, log information is integrated into electronic document data and managed. In the second embodiment, log information is stored and managed in the separate server SE independent of the client C1. In the third embodiment, log information is stored and managed separately from electronic document data in the client C1.

The client C1 is a computer terminal in which software can be installed. In the present embodiment, the software is programmed to perform the functions of the log information update unit 51 including the unique ID generation module 511 and the log information update module 512. When the first electronic document data being loaded in the OS 10-based word processor unit 40 is newly created as second electronic document data due to a change in the storage location or name thereof, the unique ID generation module 511 generates the unique ID of the second electronic document data and modifies the unique ID of the first electronic document data to a parent ID, as shown in FIG. 1. In other words, when the storage location or name of electronic document data A having parent ID "AA1" and unique ID "AC3" is changed, new electronic document data such as B or C is newly created, and the unique ID of the new electronic document data B or C is newly generated. In addition, the unique ID of the existing electronic document data A is modified to the parent ID of the new electronic document data B or C. When the new electronic document data B or C independent of the existing electronic document data A is newly created by changing the storage location or the new electronic document data B or C is created by changing the name of the existing electronic document data A, the unique ID generation module 511 newly creates the unique ID of the new electronic document data B or C, and sets the unique ID of the existing electronic document data A as the parent ID of the new electronic document data B or C. Accordingly, the distribution path between pieces of electronic document data A to H may be determined by determining the relationship between the parent ID and unique ID of each of the existing electronic document data A and the new electronic document data B or C.

For reference, the new electronic document data B and C associated with the existing electronic document data A may be created in the same client C11, and new electronic document data associated with the existing electronic document data may be created in different clients C11 to C14. In the case of creating a unique ID in the present embodiment, when an electronic document is closed after opening (executing) and saving (renaming) the electronic document, when an electronic document is opened and closed after changing a name directly without opening the electronic document, and when the name of an electronic document is not changed but a storage path is changed within the range of the clients C11 to C14 or via a method of transmission to other clients C11 to C14, the unique ID and parent ID of the corresponding electronic document may be modified.

The log information update module 512 generates or updates a storage path attributable to the creation of the second electronic document data as log information, and stores it in the log information storage unit SE1. In greater detail, electronic document data D is newly created from the electronic document data A and C. In other words, the corresponding electronic document data D has an execution history of electronic document data A→electronic document data C→electronic document data D. Accordingly, the corresponding electronic document data D has the execution history as log information. In the same manner, another electronic document data E has an execution history of electronic document data A→electronic document data C→electronic document data E as log information. When log information is generated for each piece of electronic document data, the unique ID generation module 511 generates or modifies the parent ID and unique ID of the electronic document data and configures the parent ID and the unique ID in the electronic document data, and the log information update module 512 generates log information having data on the execution history of the electronic document data and configures the log information in the electronic document data. However, as another embodiment of the log information storage, the unique ID generation module 511 may generate and modify the parent ID and unique ID of electronic document data, may configure them in the electronic document data, and may store them in the log information storage unit SE1 built in a separate server SE, as shown in FIG. 2. In addition, as another embodiment of the log information storage, the unique ID generation module 511 may generate and modify the parent ID and unique ID of electronic document data, may configure them in the electronic document data, and may store them in the log information storage unit 52 built in the client C1, as shown in FIG. 3.

Thereafter, the path tracking units SE2 and 53 of the tracking system according to the present invention search for log information in electronic document data, the log information storage unit SE1 configured in the server SE, or the log information storage unit 52 configured in the client C1, and identify an execution history from the retrieved log information. As described above with reference to FIG. 1, since the log information is an execution history of the electronic document data, it contains the unique ID of the previous version of the corresponding electronic document data, an executing computer (client) or program, and a URL from which the electronic document data has been transmitted. The path tracking units SE2 and 53 may check the log information and track the distribution path of the electronic document data together with the above items.

The tracking system according to the present invention further includes the path visualization unit 54 configured to visualize and output the execution history of log information, identified from the path tracking units SE2 and 53, as a connection structure of nodes and edges as shown in FIG. 1. Since the log information of the electronic document data includes the unique ID and parent ID of the previous version, the path tracking units SE2 and 53 may can identify electronic document data for each version by checking for the unique ID and the parent ID. In the log information obtained in the above manner, a path visualization unit 54 may visualize the execution history of specific electronic document data so that a user can intuitively understand the execution history, and an arrow may be marked at an edge to distinguish the electronic document data of a previous version from the electronic document data of a later version.

The tracking system according to the present invention further includes a URL identification unit 55 configured to, when the first electronic document data is downloaded through the web browser 20 and newly created as the second electronic document data, identify information about a URL from which the first electronic document data has been transmitted in the alternative stream of an NTFS file system and add the URL information to the log information of the second electronic document data. As is well known, when electronic document data is downloaded, the originating URL of the electronic document data is stored as Zone.Identifier in the alternative stream of the NTFS file system, so that the log information of the newly created electronic document data may be identified in greater detail.

Figure 4:
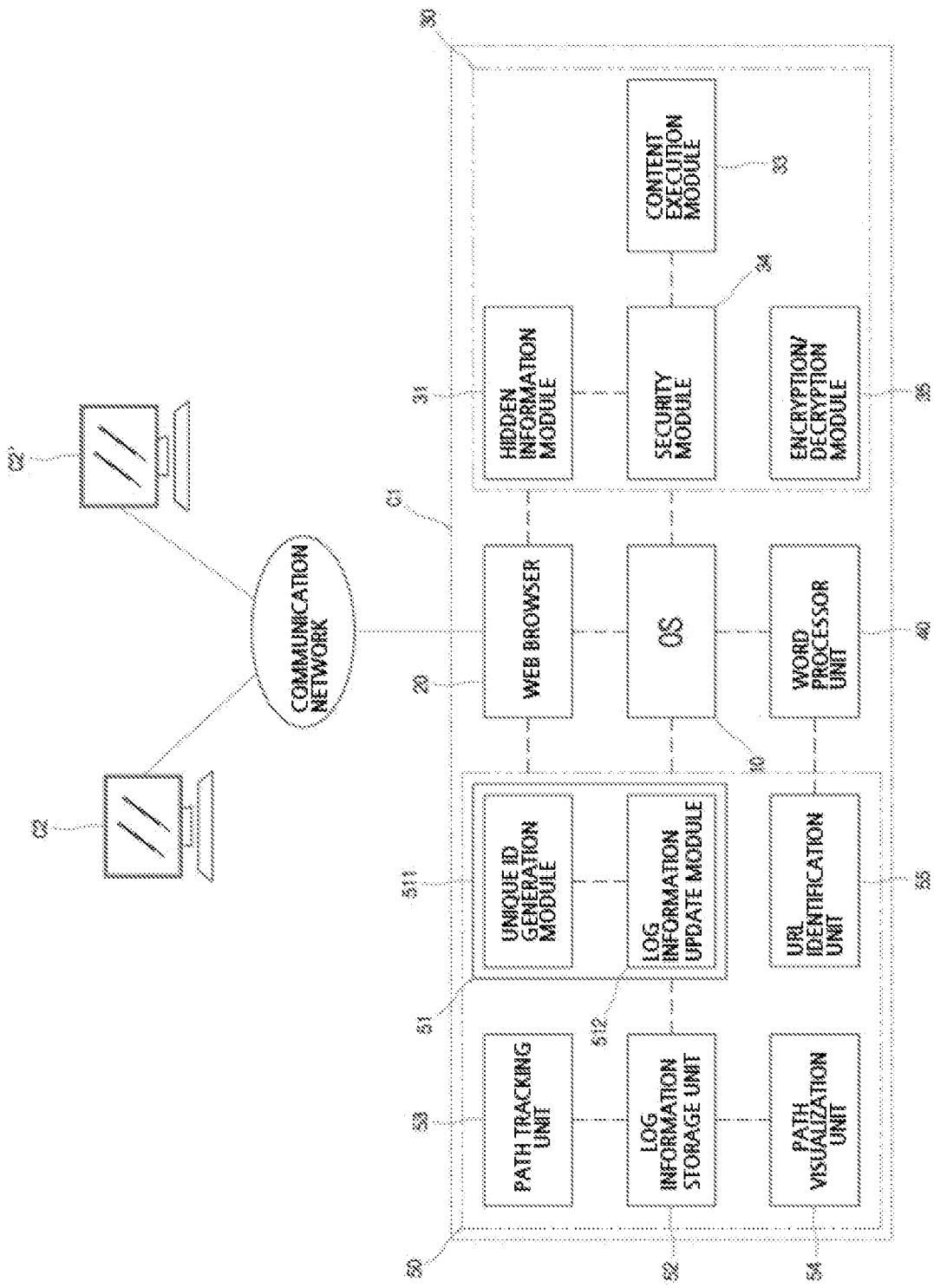
FIG. 4 is a block diagram showing a system for tracking the path of an electronic document according to still another embodiment of the present invention.

FIG. 4 is a block diagram showing a system for tracking the path of an electronic document according to another embodiment of the present invention.

Referring to FIG. 4, the tracking system according to the present embodiment further includes a security agent 30 configured to generate hidden information, in which a security agent 30-dedicated fmtID is designated, by hiding custom.xml, containing a unique ID and a parent ID for the security of the first electronic document data or second electronic document data, at a specific location in the source code of the corresponding electronic document data using a steganographic technique. In other words, the unique ID and parent ID generated and modified via the unique ID generation module 511 are stored as the hidden information of the electronic document data without exposure to the outside by the word processor unit 40.

In the tracking system according to the present invention, although the log information generated by the log information update module 512 may be stored in electronic document data in the form of hidden information, it may be stored in the log information storage unit SE1 of the separate server SE, or may be stored in the log information storage unit 52 of the client C1, as described above. An embodiment in which log information is stored in electronic document data in the form of hidden information will be described as an example below.

The security agent 30 according to the present invention will be described in greater detail below. The security agent 30 includes: a hidden information module 31 configured to search for custom.xml having fmtID (a format identifier) as the identification value thereof by analyzing the source code of electronic document data executed by an OS 10-based word processor unit 40, and to check for authority information and log information configured in custom.xml.; an information identification module 32 configured to ascertain an execution history of the electronic document data from the log information identified by the hidden information module 31, and to output the execution history; a content execution module 33 configured to control the content execution of an electronic document by the word processor unit 40 according to the control of a security module 34; and the security module 34 configured to generate custom.xml, containing authority information for the security of an electronic document and log information about an execution history of the electronic document, at a specific location of the source code of the corresponding electronic document by a steganographic technique and designate a security agent 30-dedicated fmtID, and to compare the authority information identified by the hidden information module 31 and the execution history identified by the information identification module 32 with reference information and restrict the allowable range of content.

The hidden information module 31 searches for custom.xml having fmtID as the identification value thereof by analyzing the source code of the electronic document data executed by the OS-based word processor unit 40, and checks for the authorization information and the log information configured in custom.xml.

As described above, since the security module 34 generates hidden information, containing authority information and log information, in an electronic document, the hidden information module 31 checks for hidden information in a custom.xml format by searching for fmtID generated as the identification value of the hidden information. Since the hidden information according to the present invention is generated via a steganographic technique, the word processor unit 40 cannot recognize the hidden information in a custom.xml format, and only the hidden information module 31 can recognize fmtID by checking for it. Meanwhile, the log information is updated during a storage process through the data duplication and name change of the electronic document. The history configured in the log information may be information such as the opening time, closing time, storage time, and storage location of the electronic document, and the ID of a current version and the ID of a previous version generated during a storage process.

The information identification module 32 controls the path tracking unit 53 so that the path tracking unit 53 ascertains an execution history of the electronic document from the log information identified by the hidden information module 31. In greater detail, as described as an example above, the history of log information configured in the hidden information may include the opening time, closing time, storage time, and storage location of the electronic document, and the ID of a current version and the ID of a previous version generated during a storage process. The path tracking unit 53 may determine the execution history and distribution path of the electronic document by ascertaining the history. Accordingly, the security agent 30 operates in conjunction with the path tracking unit 53 in order to perform the security processing of electronic document data, and includes the information identification module 32 in order to perform processing.

The content execution module 33 controls the content execution of the electronic document by the word processor unit 40 under the control of the security module 34. In greater detail, since the hidden information includes authority information for the electronic document, the range of execution of the electronic document needs to be restricted in the electronic document according to the authority information. Accordingly, when the security module 34 ascertains the authority information and designates the allowable range, the content execution module 33 forcibly restricts the execution of the electronic document to the allowable range while operating in conjunction with the word processor unit 40. In other words, when the allowable range of the electronic document is restricted only to the reading of content, the content execution module 33 forcibly stops an attempt to edit the electronic document in case of the attempt to edit the electronic document while checking for the access of the word processor unit 40 to the electronic document.

The security module 34 generates hidden information, which cannot be recognized by the word processor unit 40, in the electronic document so that only the security agent 30 can recognize it. For this purpose, the hidden information is generated and inserted at a specific location in the source code of the electronic document by a steganographic technique. The hidden information is configured in an electronic document in a custom.xml format, and fmtID (a format identifier) is set as the identification value of custom.xml. custom.xml contains authority information and log information for the corresponding electronic document, and the hidden information module 31 may be located independently at a specific location in the source code of the electronic document. As a result, the hidden information is configured in the electronic document as data that cannot be recognized or is ignored by the word processor unit 40, such as the steganographic data, and only the hidden information module 31 may check the hidden information and also read the authority information and the log information by recognizing the designated fmtID. In addition, since the hidden information configured in the electronic document is an object independent of the electronic document, the hidden information may maintain the form thereof even when the content or attributes of the electronic document are changed or the extension of the electronic document is changed, and the hidden information module 31 may identify the authority information and the log information through searching. For reference, a steganographic technique is one of the data concealment techniques, and refers to a technique for inserting data into other data or research thereinto. Additionally, a cryptographic technique is a means of making the content of a message unreadable, whereas a steganographic technique hides the presence of a message itself.

Thereafter, the security module 34 compares the authority information identified by the hidden information module 31 and the execution history identified by the information identification module 32 with the reference information, and restricts the allowable range of the content. As described above, the authority information relates to the allowable range for the execution of the corresponding electronic document. Accordingly, the allowable range is identified from the authority information configured in the hidden information, and a restriction is imposed through the content execution module 33 so that the word processor unit 40 executes the corresponding electronic document only for allowed execution items. A technique for comparing authority information and an execution history with reference information will be described again below.

Meanwhile, the client C1 in which the security agent 30 is installed may access a communication network using a web browser 20 and perform data communication with another client C2. When an electronic document for which security is set is received by the web browser 20 during the data communication, the security agent 30 searches for hidden information in the corresponding electronic document, and checks for and updates log information from the found hidden information. As described above, since the log information may include the storage time and version of the electronic document, the security module 34 reinforces the log information with the storage time and version of the corresponding electronic document when the corresponding electronic document is received and stored.

Furthermore, the security agent 30 according to the present invention further includes an encryption/decryption module 35 configured to encrypt/decrypt overall electronic document data or content under the control of the security module 34, and the security module 34 controls the encryption/decryption module 35 while operating in conjunction with the word processor unit 40. More specifically, in order to enhance the security of the electronic document, the security agent 30 may encrypt the data of the electronic document whose execution is terminated and store it in the client C1. To this end, when recognizing the process of terminating the electronic document in the word processor unit 40, the security module 34 performs control so that the encryption/decryption module 35 encrypts the electronic document data stored by the word processor unit 40. The encryption/decryption module 35 may generate and locate a temporary file whose name and extension match the name and extension of the corresponding electronic document data in the storage path of the encrypted electronic document data so that the word processor unit 40 can recognize and load the encrypted electronic document data, and the actual electronic document data containing content may be stored in the form of an encrypted file. However, the encryption procedure is only an embodiment of the present invention, and the storage process of the word processor unit 40 is performed in conjunction with the security module 34 so that the security module 34 can encrypt the electronic document data.

Thereafter, when the user attempts to execute the encrypted electronic document data through the word processor unit 40, the security module 34 recognizes the execution process of the word processor unit 40 and performs control so that the encryption/decryption module 35 decrypts the encrypted electronic document data. It will be apparent that the encryption/decryption module 35 decrypts designated data under the control of the security module 34, and when recognizing the decryption, the security module 34 allows the corresponding electronic document data to be executed by the word processor unit 40.

FIG. 5 is a flowchart sequentially showing the process of performing the security processing of electronic document data based on a tracking system, authenticating a user, and outputting the content of the electronic document data according to an embodiment of the present invention, and FIG. 6 is an image view showing an embodiment of the hidden information of electronic document data whose security processing has been performed.

Referring to FIGS. 3 to 6, a tracking system-based tracking method according to the present invention will be described as follows:

S10: Hidden Information Setting Step

When the word processor unit 40 generates and stores the data file of an electronic document, the security module 34 of the security agent 30 allows an author having authored the electronic document or a right holder having the right of the electronic document (hereinafter referred to as a "setter") to set the authority information of the electronic document. To this end, the security agent 30 generates a security setting menu key (not shown) in the menu of the word processor unit 40 in the form of a GUI (Graphical User Interface) or a general UI. When the setter clicks the security setting menu key, the security module 34 of the security agent 30 is executed and outputs a setting layer (not shown) in which an allowable execution range can be input.

The setter inputs an allowable execution range in the output setting layer, and the security module 34 generates authority information for the allowable execution range as hidden information according to an input command value. The hidden information is generated in a custom.xml format according to a steganographic technique, and the security module 34 is disposed at a specific location in the source code of the electronic document. In addition, in custom.xml, which is hidden information, fmtID that can be recognized by the hidden information module 31 is designated as an identification value.

The security module 34 may further include log information, containing information about the execution history of the electronic document, in the hidden information. The history configured in the log information may be information including the opening time, closing time, storage time, and storage location of the electronic document, and the ID of a current version and ID of a previous version newly generated during a storage process.

S20: Hidden Information Search Step

When the word processor unit 40 attempts to execute a specific electronic document in response to an operation of a user, the hidden information module 31 of the security agent 30 searches for the hidden information in the corresponding electronic document and checks the authority information and the log information.

When the hidden information module 31 identifies the authority information, it invokes the security module 34. In contrast, when the log information is identified, the information identification module 32 is invoked.

S30: Electronic Document Execution History Ascertainment Step

In response to the invocation of the hidden information module 31, the information identification module 32 identifies the log information of the hidden information via the path tracking unit 53, and ascertains the execution history of the electronic document. As described above, the execution history may be information including the opening time, closing time, storage time, and storage location of the electronic document, and the ID of a current version and ID of a previous version newly generated during a storage process. The information identification module 32 may determine the execution history and distribution path of the electronic document through the history.

For reference, the execution history of the electronic document identified by the information identification module 32 may be output through a separate setting window (not shown), the distribution path of the corresponding electronic document may be tracked through this process, and the path visualization unit 54 may visualize and output the electronic document data in the form of nodes and edges.

S40: Electronic Document Execution Determination Step

The security module 34 compares the authority information for the security of the electronic document and the execution history of the log information with the reference information, and restricts the allowable range of the content. More specifically, the authority information is input in the form of a security level code as the allowable range for the execution of the electronic document. In other words, when the setter sets only content reading for the electronic document as the allowable range upon security setting for the electronic document, only a security level code for content reading is set in the authority information. Meanwhile, the security module 34 stores an allowable range for each security level code as the reference information. Accordingly, the security module 34 checks the security level code set in the authority information, and identifies the allowable range set for the electronic document by searching for the allowable range of the corresponding security level code from the reference information. Thereafter, when the allowable range is identified, the security module 34 transmits related data to the content execution module 33.

In addition, the log information relates to the execution history of the electronic document. The execution history of the electronic document is compared with the reference information in which the paths of harmful URLs and harmful users have been registered, and the execution of the corresponding electronic document is restricted when the electronic document in the execution history of the electronic document has passed through a path of the reference information.

S50: Electronic Document Execution Step

The word processor unit 40 executes the corresponding electronic document in response to an operation of the user, and the content execution module 33 controlled by the security module 34 controls the execution of the corresponding electronic document while operating in conjunction with the word processor unit 40. In other words, when the allowable range of the electronic document is restricted to content reading due to the authority information, the content execution module 33 having received a signal regarding content reading from the security module 34 restricts the execution of a process so that the word processor unit 40 does not perform any function other than the content reading of the user for the electronic document.

Furthermore, when the security module 34 ascertains the execution history of the electronic document from the log information and finds a path, identical to a harmful path registered in the reference information, in the execution history, the content execution module 33 having received an execution restriction signal from the security module 34 transmits a stop signal so that the word processor unit 40 does not execute the electronic document.

S60: Electronic Document Storage Step

When recognizing the process of terminating the electronic document in the word processor unit 40, the security module 34 updates one or more selected between the authorization information and the log information configured in the hidden information, and stores them in the storage means of the corresponding client C1.

The above-described present invention provides an effect of enhancing the security of data by tracking the distribution path of an electronic document through the duplication of a data file, the change of a file name, etc.

As described above, although the tracking system according to the present invention has been described and illustrated in greater detail, it should be understood that the description and illustration are intended for convenience of description and understanding of the tracking system according to the present invention. The rights of the present invention should not be restrictively construed as being limited to the configurations and data storage locations of the above-described embodiments, nor should it be interpreted as being limited by using other documents against the description of the present invention. The scope of rights of the tracking system according to the present invention should be determined based on the attached claims.

What is claimed is:

1. A system for tracking a path of an electronic document, the system implemented within a device, comprising:
   a log information update unit in a process form comprising:
   a unique identifier (ID) generation module in a process form configured to, when a first electronic document data file being loaded in a word processor unit operating based on a computer operating system (OS) is newly created as a second electronic document data file due to a change in a storage location or name thereof, newly generate a unique identifier (ID) for the second electronic document data file and modify a unique ID of the first electronic document data file to a parent identifier (ID), and to run based on the computer OS; and
   a log information update module in a process form configured to generate or update a storage path attributable to the creation of the second electronic document data file as log information, to include the log information in the second electronic document data file, and to run based on the computer OS;
   a path tracking unit in a process form configured to search for the log information in the first electronic document data file or second electronic document data file, to identify an execution history from the retrieved log information, and to run based on the computer OS; and
   a security agent in a process form configured to generate hidden information, in which a security agent-dedicated format identifier (fmtID) is designated, by hiding custom.xml, containing the unique ID and the parent ID for security of the first electronic document data file or second electronic document data file, at a specific location in source code of the corresponding electronic document data file using a steganographic technique, to compare the execution history with reference information in which paths of harmful URLs or harmful users are registered, and when the corresponding electronic document data file passes through a path of the reference information, restrict execution of the corresponding electronic document data file, and to run based on the computer OS.

2. The system of claim 1, further comprising a path visualization unit in a process form configured to visualize and output the execution history of the log information, retrieved by the path tracking unit, as a connection structure of nodes and edges, and to run based on the computer OS.

3. The system of claim 1, further comprising a URL identification unit in a process form configured to, when the first electronic document data file is downloaded through a web browser and newly created as the second electronic document data file, identify information about a uniform resource locator (URL) from which the first electronic document data file has been transmitted in an alternative stream of new technology file system (NTFS) file system and add the URL information to log information of the second electronic document data file, and to run based on the computer OS.

* * * * *